(12) United States Patent
Klein et al.

(10) Patent No.: US 11,011,765 B2
(45) Date of Patent: May 18, 2021

(54) FUEL CELL BASED POWER GENERATOR

(71) Applicant: Honeywell International Inc., Morris Plains, NJ (US)

(72) Inventors: Jeffrey Michael Klein, Minneapolis, MN (US); Steven J. Eickhoff, Brooklyn Park, MN (US); Paul Bryant Koeneman, Minnetonka, MN (US)

(73) Assignee: Honeywell International Inc., Morris Plains, NJ (US)

( * ) Notice: Subject to any disclaimer, the term of this patent is extended or adjusted under 35 U.S.C. 154(b) by 64 days.

(21) Appl. No.: 16/353,985

(22) Filed: Mar. 14, 2019

(65) Prior Publication Data

US 2020/0295389 A1    Sep. 17, 2020

(51) Int. Cl.
| | |
|---|---|
| *H01M 4/02* | (2006.01) |
| *H01M 8/04746* | (2016.01) |
| *H01M 8/04119* | (2016.01) |
| *H01M 8/04858* | (2016.01) |
| *H01M 8/04828* | (2016.01) |

(52) U.S. Cl.
CPC ... *H01M 8/04753* (2013.01); *H01M 8/04156* (2013.01); *H01M 8/04895* (2013.01); *H01M 8/04925* (2013.01); *H01M 8/04828* (2013.01)

(58) Field of Classification Search
None
See application file for complete search history.

(56) References Cited

U.S. PATENT DOCUMENTS

| | | | |
|---|---|---|---|
| 6,277,509 B1 | 8/2001 | Wheeler | |
| 8,347,645 B1 * | 1/2013 | Miller | F25B 27/00 62/236 |
| 2002/0150803 A1 | 10/2002 | Yang | |
| 2004/0126643 A1 | 7/2004 | Kinkelaar et al. | |
| 2006/0014059 A1 * | 1/2006 | Wood | H01M 8/04126 429/413 |
| 2006/0059778 A1 | 3/2006 | Shurtleff et al. | |
| 2010/0219087 A1 | 9/2010 | Fujita et al. | |
| 2011/0129745 A1 | 6/2011 | Givens et al. | |
| 2013/0108940 A1 | 5/2013 | Langan et al. | |
| 2018/0277860 A1 | 9/2018 | Eickhoff et al. | |
| 2020/0295387 A1 | 9/2020 | Koeneman et al. | |

FOREIGN PATENT DOCUMENTS

JP    2017133624 A    8/2017

OTHER PUBLICATIONS

"European Application Serial No. 20161662.0, Partial European Search Report dated Aug. 18, 2020", 12 pgs.
"U.S. Appl. No. 16/354,060, Non Final Office Action dated Sep. 14, 2020", 24 pgs.
"Application Serial No. 16/354,060, Response filed Dec. 14, 2020 to Non Final Office Action dated Sep. 14, 2020", 26 pgs.
"European Application Serial No. 20161662.0, Extended European Search Report dated Nov. 18, 2020", 10 pgs.

* cited by examiner

*Primary Examiner* — Jacob B Marks
(74) *Attorney, Agent, or Firm* — Schwegman Lundberg & Woessner, P.A.

(57) ABSTRACT

A fuel cell based power generator includes a fuel cell element, an ambient air path configured to receive ambient air and provide the ambient air across a cathode side of the fuel cell element, receive water from the fuel cell element and provide wet air to the water exchanger element, and a fuel cell cooling mechanism associated with the fuel cell element, separate from the ambient air path and configured to cool the fuel cell element.

19 Claims, 3 Drawing Sheets

FUEL CELL BASED POWER GENERATOR

BACKGROUND

The run time of unmanned air systems (UAS), sometimes referred to as drones, is limited by their power sources. State of the art UAS use light-weight lithium ion/polymer batteries with specific energies that range from ~200-300 Wh/kg, enabling flight times on the order of 20-60 min. For emerging applications including infrastructure inspection (e.g. roads, bridges, power lines, rail, pipelines, etc.) and package delivery, it may be desired to have greater flight times on a battery charge, among other suitable applications. In some instances, greater than six-hour flight times are desired in order for such UAS to be commercially viable.

Existing obstacles include efficient energy storage and utilization faces. Proton exchange membrane (PEM) fuel cells for man-portable power and micro air vehicles require light-weight, small-size, and high-rate hydrogen sources. Commercially available hydrogen sources such as metal hydrides, compressed hydrogen in cylinders, or catalytic waterborohydride hydrogen generators are capable of high rate hydrogen generation, but are heavy and bulky.

While some hydrogen generators are light-weight and have small size, they are incapable of generating hydrogen at a sufficiently high rate for many applications.

DETAILED DESCRIPTION

Figure 1:
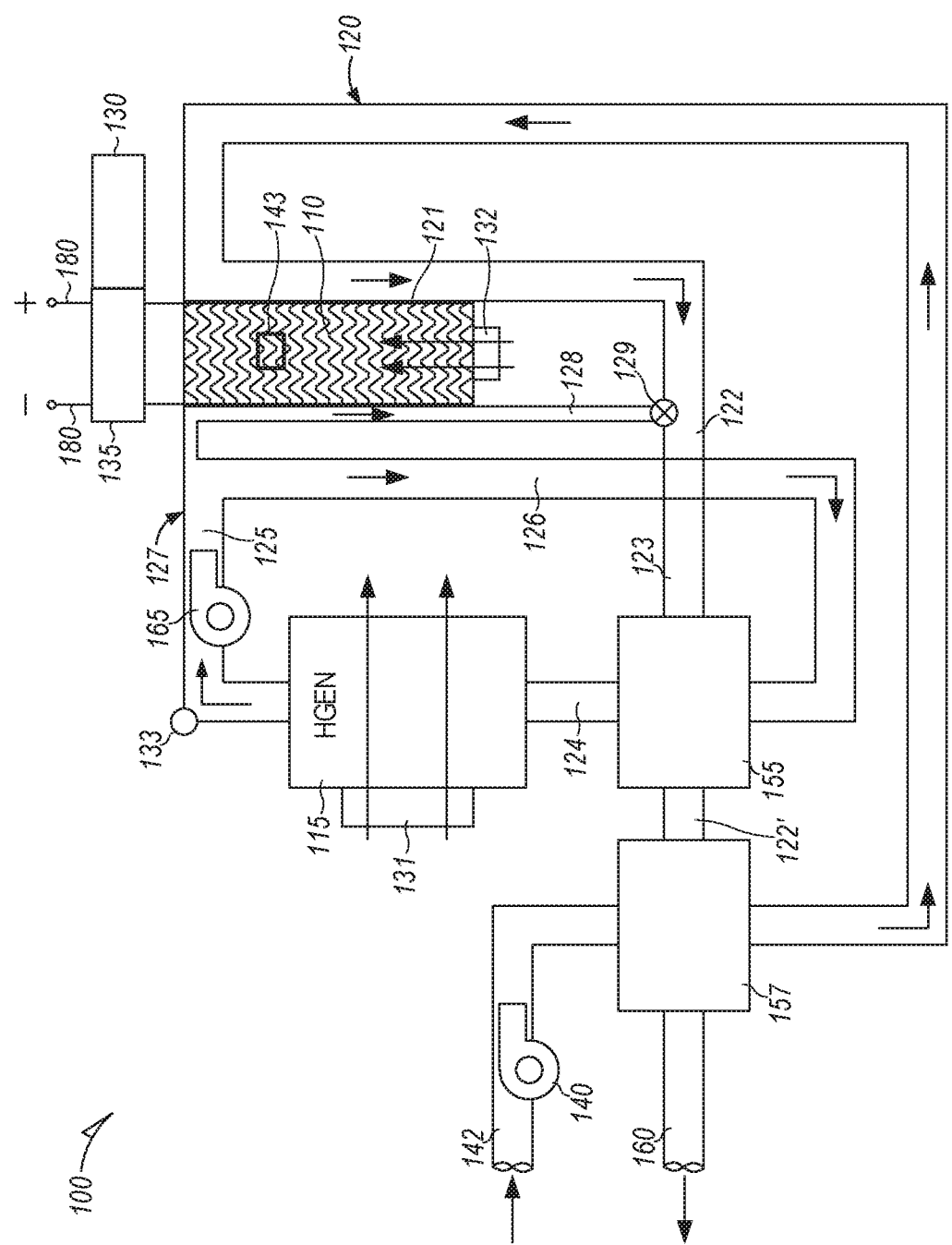
FIG. 1 is a schematic diagram of a fuel cell based power generator according to an example embodiment.

Devices and methods for providing a fuel cell based power generator are disclosed. One fuel cell based power generator, includes a fuel cell element, a water exchanger element, a hydrogen generator element, an ambient air path configured to receive ambient air and provide the ambient air across a cathode side of the fuel cell element, receive water from the fuel cell element and provide wet air to the water exchanger element, and a recirculating hydrogen path. The recirculating hydrogen path having a primary path and a secondary path, the secondary path configured to receive hydrogen from the hydrogen generator element, provide the hydrogen, via the secondary path that passes adjacent an anode side of the fuel cell element and configured to provide dry hydrogen back to the hydrogen generator, via the primary path.

A method includes passing ambient air, via an ambient air path, past a cathode side of the fuel cell to a water exchanger, picking up water from the cathode side of the fuel cell and exhausting air and nitrogen to ambient, passing hydrogen, via a recirculating primary hydrogen path, where the water exchanger transfers water from the ambient air path comprising a cathode stream to the recirculating hydrogen path comprising an anode stream, and passing the water to a hydrogen generator to add hydrogen to the recirculating hydrogen path and passing the hydrogen via a secondary hydrogen path past the anode side of the fuel cell.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in some embodiments. The software may consist of computer executable instructions stored on computer readable media or computer readable storage device such as one or more non-transitory memories or other type of hardware-based storage devices, either local or networked.

Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

In various embodiments of the present disclosure, a high specific energy power source including a fuel cell may be used for battery/fuel cell powered devices, such as a UAS. Embodiments of the present disclosure can be capable of, for instance, providing four to twelve times the run time of state of the art lithium batteries. Some embodiments may, for example, provide six to twelve or more hours of flight time.

A fuel cell based power generator provides run time improvement and energy efficiency under specified load power profiles. Moreover, the fuel cell based power generator may be substantially lighter than prior energy storage devices and may have lower projected lifecycle costs, without compromising operation temperature range or environmental and safety performance. An improvement in runtime lies in the innovative fuel-cell technology and its fuel chemistry based on lithium aluminum hydride (LAH) that requires no net water consumption in order to sustain its operation, thus eliminating the need for a water fuel reservoir, which enables the energy source to be substantially smaller and lighter than other conventional chemical hydride or direct methanol fuel cells with on-board storage of water (fuel, diluent, or solvent).

FIG. 1 is a schematic diagram of a fuel cell based power generator 100 in accordance with an embodiment of the present disclosure. In the embodiment shown in FIG. 1, power generator 100 includes a fuel cell 110 and a hydrogen generator 115.

As used herein, the term "fuel cell" can, for example, refer to an electrochemical cell that converts chemical energy from a fuel into electricity through an electrochemical reaction. For example, hydrogen can be provided to fuel cell 110 such that hydrogen is consumed in an electrochemical reaction to produce electricity, as is further described herein. An ambient air path 120 is configured to run ambient air past a cathode side of the fuel cell 110, via ambient air path portion 122. The ambient air path 120 is part of a cathode loop, which includes all the paths that ambient air circulates through, including interiors of components the ambient air passes through.

A reaction in the fuel cell 110 generates electrical power and adds water as a by-product to the ambient air path portion 122. This water is then provided to the hydrogen generator 115, which contains one or more fuels that release hydrogen responsive to exposure to water, which may be in vapor form. As used herein, the term "hydrogen generator" refers to a device which contains one or more fuels that release hydrogen responsive to exposure to water, which may be in the form of humidity.

The hydrogen generator 115 provides the released hydrogen to a recirculating hydrogen path 125, which splits into two parts at junction 127. The two parts include a primary path 126 and a secondary path 128. The primary path 126 recirculates released hydrogen back to hydrogen generator 115. The secondary path 128 runs past the anode side of the fuel cell 110 to provide the hydrogen to the fuel cell 110. The secondary path 128 is part of an anode loop, which includes all the paths that hydrogen recirculates through, including interiors of components the ambient air passes through.

Hydrogen from the recirculating hydrogen path 125 reacts with oxygen from the ambient air path 120 in fuel cell 110, producing electrical power, water vapor, and heat as reaction byproducts. The byproducts on the cathode side of the fuel cell 110 are removed from the fuel cell by the air flowing within ambient airflow path 120. Leftover hydrogen and any inert gases that leak/permeate into the anode loop over time continue through the recirculating hydrogen path 125.

In some embodiments, a cooling mechanism 132, such as a fan or liquid cooling loop, can be used with the fuel cell portion system to assist in the removal of heat. In such an embodiment, most of the heat generated in the fuel cell is removed via this liquid cooling loop and rejected to ambient via a heat exchanger and/or fan, represented in block form as part of the cooling mechanism 132.

In some embodiments, as shown in FIG. 1, the secondary path 128 can include a purge valve 129 that purges inert gases (e.g. nitrogen, water vapor) that build up over time in the anode loop into an ambient airflow path portion 123 of the ambient airflow path 120. These gases are purged periodically by actuating the purge valve 129, for example, based on predetermined timing or a sensed parameter like fuel cell voltage or hydrogen concentration. In some embodiments, the valve may be slightly open most of the time to continuously remove the inert gases, with most of the hydrogen flowing to and being consumed by the anode of the fuel cell.

In some embodiments, the fuel cells provide current to a controller 135 that charges a Li-ion battery or batteries 130. The controller 135 also provides power to a load, such as the UAS. In some implementations, the batteries can provide the ability to supply higher and more dynamic levels of power than simply utilizing the fuel cells directly, which can be slower to respond and not normally be able to provide high levels of power that may be required for operation of the UAS in a desired manner, such as accelerating sufficiently while carrying a load.

Controller 135 may comprise a microprocessor, circuitry, and other electronics to receive data representative of sensed pressure, temperature, and other parameters and utilize control algorithms, such as proportional/integral/derivative (PID) or other type of algorithms to control mechanisms to modify the parameters to meet one or more different setpoints. Controller 135 may also be referred to as a power management module or controller 135. In some embodiments, control may be based on proportional controller.

In some embodiments, the fuel cell based power generator 100 has a system configuration (implemented in a X590 form factor battery package in one embodiment) and its operating principle is schematically depicted in FIG. 1. Hydrogen generator 115, in various embodiments, is a replaceable and disposable "fuel-cartridge" unit that generates $H_2$ for a $H_2$/oxygen proton exchange membrane (PEM) fuel cell 110, and a permanent unit that, in some embodiments, includes PEM fuel cell 110, Li-ion recharge battery 130 as an output stage to interface with an external load, and the controller 135 that controls electronic and fluidic control circuits (e.g., controlling one or more fluid movement apparatuses) to dynamically sense and optimize the power generator 100 under varying load and environmental conditions.

Ambient air serves as the fuel cell power generator 100 oxygen source, carrier gas for water vapor, and coolant gas for the fuel cell stack and $H_2$ generator. A first fluid movement apparatus (e.g., a fan) 140 draws in fresh air from ambient via an inlet 142 and circulates it over the cathode side of the fuel cell stack at 121 via the ambient air path or passage 120.

Since the fuel cell 110 reaction is exothermic, the temperature of the fuel cell 110 increases and may be measured by a first temperature sensor 143 associated with fuel cell 110, which is positioned to measure the temperature of the fuel cell 110. The temperature sensor is shown in block form and may be placed anywhere such that it is thermally coupled to the fuel cell 110 to provide a reliable measurement of the temperature of the fuel cell 110. Sensor 143 may comprise multiple temperature sensors. In one embodiment, one of the temperature sensors is coupled to provide data representative of the temperature proximate the anode, and another coupled to provide data representative of the temperature proximate the cathode of the fuel cell 110. The temperature data is provided to the controller 135 for use in controlling to one or more setpoints. A fuel cell set point temperature of the fuel cell 110 is indicated as 60° C., which has been found to be a temperature at which the fuel cell 110 functions most efficiently.

In further embodiments, the set point may vary between 40° C. and 80° C., and may vary further depending on the configuration and specific materials utilized in fuel cell 110 and system 100. Different optimal set points for the fuel cell may be determined experimentally for different fuel cells and may be found to be outside the range specified above.

The fuel cell temperature is modified via cooling mechanism 132 (e.g., liquid cooling loop with liquid pump, heat exchanger, and fan) under control of controller 135 that receives temperature information from first temperature sensor 143. The first temperature sensor 143 may include separate temperature sensors to sense temperatures of both the anode side and cathode side of the fuel cell 110.

In some embodiments, the fuel cell temperature and hydrogen generator temperature can be controlled separately. Separately controllable fans and or fluid pumps may be used for such independent control. The power management module may control various pressures and temperatures via the various mechanisms using one or more of PID control, proportional control, or other type of algorithm. Temperatures may be controlled within desired temperature ranges defined by upper and lower temperature thresholds.

While the fuel cell 110 is producing electrical power as well as heat, ambient air flowing within path 120 delivers oxygen to the fuel cell 110 cathode and removes water vapor generated by the reaction in the fuel cell 110. The hot, humid air continues down path 120 to a first water exchanger 155. The water exchanger 155 extracts water from the hot, humid ambient air and passes the extracted water into the hydrogen flow path 124 (anode loop). The hot, somewhat drier air continues down path 122' to a second water exchanger 157, where heat and water is passed into the cathode loop. This heat and water raise the temperature and humidity of the incoming ambient air, which improves fuel cell performance. After exiting the second water exchanger, the warm dry air is exhausted to the ambient at 160.

Water exchanger 155, and the operation of water exchanger 155, is further described herein. For instance, water exchanger 155 can be a light-weight, low pressure-drop water exchanger, as will be further described herein.

The extracted water from the ambient air path is then provided to the recirculating hydrogen path to create humid hydrogen ($H_2$) at 124. This humid $H_2$ then flows to the hydrogen generator where water therein interacts with the fuel to generate additional hydrogen.

The hydrogen generator 115 also has a set point temperature at which it operates most efficiently. The temperature may be measured by sensing the temperature of the hydrogen as it exits the hydrogen generator 115 as represented by the position of a sensor 133, which may be a temperature sensor and also may include a pressure sensor. The hydrogen generator experiences an exothermic reaction and has an optimal operating set point is shown as 80° C., but may vary from 60° C.-100° C. or outside the range depending on the composition of the hydrogen generator used.

The hydrogen generator temperature may be controlled by varying the speed of one or more cooling mechanisms 131 positioned to remove heat from the hydrogen generator. The cooling mechanism may be positioned on the outside of the hydrogen generator or positioned proximate the hydrogen generator to effect cooling of the hydrogen generator. For example, in some embodiments, the hydrogen generator temperature is modified by an external cooling mechanism (e.g., a fan, blower, etc.) positioned, for instance, on the surface of the generator. The cooling mechanism may be controlled via the controller 135 using PID or other control algorithms, such as proportional control. The hydrogen generator could also be cooled using a liquid cooling loop and associated liquid pump, heat exchanger, and fan.

The humid hydrogen 124 flows into the hydrogen generator 115, where the water reacts with the fuel and generates hydrogen. The now dry hydrogen leaves the hydrogen generator and flows into blower 165, which raises the pressure.

The higher pressure dry hydrogen then progresses down the path 125 to a split 127 where some of the dry $H_2$ enters a primary path 126 and some dry $H_2$ enters a secondary path 128.

The secondary path 128 is located adjacent the anode side of the fuel cell to provide hydrogen to the fuel cell, while the primary path can be located further away from the fuel cell. This configuration allows for a large amount of hydrogen to recirculate continuously through the system in a hydrogen loop (to efficiently extract the water from the cathode via the ambient air path water exchanger 155) while flowing a smaller amount of hydrogen to the fuel cell via secondary path 128.

The secondary path 128 can be a dead end with a purge valve 129 therein that allows inert gasses (e.g., nitrogen, water vapor) to be purged from the anode stream by actuating the valve periodically (e.g., based timing or a sensed parameter such as fuel cell voltage or oxygen concentration). Because some water vapor is included in the inert gas, it is desirable to purge the inert gas into the cathode stream 122 upstream of the primary water exchanger 155, so that the water vapor can be recovered via water exchangers 155 and 157.

The anode loop pressure as measured by sensor 133 is controlled by varying the blower 165 fan speed, which controls the amount of water recovered from through the water exchanger 155, and hydrogen generated in the hydrogen generator 115. Higher blower fan speeds lead to higher anode loop pressures, for example, pressures slightly above ambient pressure by 1-10 psig.

Steady state operation of the fuel cell based power generator can be achieved by:

1) Controlling cathode blower speed based on power demand from load;

2) Controlling anode blower speed based on anode loop pressure (e.g., measured via pressure sensor 133);

3) Controlling fuel cell cooling based on fuel cell temperature (e.g., via cooling mechanism 132); and/or 4) Controlling pump/fan speed control for cooling mechanism 131 (e.g., fan, blower, cooling loop, etc.) associated with the hydrogen generator (e.g., mounted on the outside of the hydrogen generator) based on hydrogen generator temperature.

In some embodiments, as air passes by the fuel cell stack 110 from the ambient air path 120 and the secondary path 128 of the recirculating hydrogen path 125, oxygen and hydrogen are consumed by the fuel cell 110, and water vapor and waste heat are removed by the ambient air at fuel cell cathode 121.

The power generated in the fuel cell stack may be fed to controller 135 which may include power management circuitry. The circuitry conditions the power and provides it as electricity to a load as indicated by contacts 180.

One or more sensors may measure, in addition to the temperature sensor previously described, humidity, and/or pressure throughout the system 100. Data provided by the sensors, as well as the electrical load and/or charge state of the charge storage device 130 are used by the control controller 135 to determine and set the various fluid movement apparatus speeds to control the temperature of the elements to corresponding set points. Power management circuitry 135 can include a controller, as is further described herein.

Fuel consumption may also be monitored via controller 135 or other power monitoring device, and the remaining capacity may be displayed via a display on the fuel cell power generator packaging as driven by controller 135 in various embodiments. In some embodiments, greater than 95% fuel utilization may be achieved through an optimized LAH fuel formation (e.g., through one or more of porosity, particle size/distribution, rate enhancing additives, or other formulation characteristics).

In some embodiments, the LAH-water reaction generates heat (~150 kJ/mol LAH, exothermic) leading to a rise in temperature in the fuel. The temperature may be monitored along with controlling the speed of the hydrogen generator cooling fan to maintain the temperature at a desired set point for optimal operation.

Electrochemical system power performance can substantially degrade at low temperatures (−40° C.) due to slower reaction kinetics and lower electrolyte conductivity. The hybrid fuel cell may avoid freezing problems by: 1) using water in vapor form, 2) adjusting airflow to prevent water vapor condensation, 3) using heat generated by the fuel cell stack and $H_2$ generator to regulate their temperatures, 4) Insulating certain system components, and 5) using electrically power heaters to control the temperature of certain system components. In some embodiments, noryl plastic packaging (e.g., consistent with the type used on the Saft BA5590) may be used. Many different types of plastics and/or other materials (e.g., that provide low weight yet sufficient tolerance to the operating parameters and environmental conditions of the generator) may be used.

Hydrogen generator 115 in some embodiments is a high-rate hydrogen generator suitable for man-portable power and micro air vehicle applications that provides four to five times the hydrogen of commercially available hydrogen sources of the same size and weight. Many different hydrogen producing fuels, such as LAH may be used. In further embodiments, the hydrogen producing fuel may, for example, include $AlH_3$, $LiAlH_4$, $NaAlH_4$, $KAlH_4$, $MgAlH_4$, $CaH_2$, $LiBH_4$, $NaBH_4$, LiH, $MgH_2$, $Li_3Al_2$, $CaAl_2H_8$, $Mg_2Al_3$, alkali metals, alkaline earth metals, alkali metal silicides, or combinations of one or more thereof.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Hydrogen-Generating Composition for a Fuel Cell

In various embodiments, the present disclosure provides a hydrogen-generating composition for a fuel cell.

The hydrogen-generating composition reacts with water to generate hydrogen gas. The phase of the water contacted with the hydrogen-generating composition to generate the hydrogen gas can be any suitable phase, such as liquid water (e.g., in a pure state, diluted state, or such as having one or more compounds or solvents dissolved therein) or gaseous water (e.g., water vapor, at any suitable concentration). The generated hydrogen gas can be used as the fuel for a hydrogen-consuming fuel cell.

The hydrogen-generating composition can be in any suitable form. The hydrogen-generating composition can, for example, be in the form of a loose powder or a compressed powder. The hydrogen-generating composition can also be in the form of grains or pellets (e.g., a powder or grains compressed into pellets). The hydrogen-generating composition can have any suitable density, such as, for example, about 0.5 $g/cm^3$ to about 1.5 $g/cm^3$, or about 0.5 $g/cm^3$ or less, or less than, equal to, or greater than about 0.6 $g/cm^3$, 0.7, 0.8, 0.9, 1, 1.1, 1.2, 1.3, 1.4 $g/cm^3$, or about 1.5 $g/cm^3$ or more.

In some embodiments, the hydrogen-generating composition is substantially free of elemental metals. In some embodiments, the hydrogen-generating composition can be substantially free of elemental aluminum.

Hydride

The hydrogen-generating composition may include one or more hydrides. The one or more hydrides can form any suitable proportion of the hydrogen-generating composition, such as about 50 wt % to about 99.999 wt %, about 70 wt % to about 99.9 wt %, about 70 wt % to about 90 wt %, or about 50 wt % or less, or less than, equal to, or greater than about 52 wt %, 54, 56, 58, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98, 99, 99.9, 99.99, or about 99.999 wt % or more.

The hydride can be any suitable hydride, such that the hydrogen-generating composition can be used as described herein. The hydride can be a compound in which one or more hydrogen centers (e.g., one or more hydrogen atoms, or a group that includes one or more hydrogen atoms) having nucleophilic, reducing, or basic properties.

The hydrogen atom in the hydride can be bonded to a more electropositive element or group. For example, the hydrogen can be chosen from an ionic hydride (e.g., a hydrogen atom bound to an electropositive metal, such as an alkali metal or alkaline earth metal), a covalent hydride (e.g., compounds including covalently bonded hydrogen and that react as hydride, such that the hydrogen atom or hydrogen center has nucleophilic properties, reducing properties, basic properties, or a combination thereof), a metallic hydride (e.g., interstitial hydrides that exist within metals or alloys), a transition metal hydride complex (e.g., including compounds that can be classified as covalent hydrides or interstitial hydrides, such as including a single bond between the hydrogen atom and a transition metal), or a combination thereof.

The hydride can be chosen from magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof. The hydride can be chosen from lithium aluminum hydride ($LiAlH_4$), calcium hydride ($CaH_2$), sodium aluminum hydride ($NaAlH_4$), aluminum hydride ($AlH_3$), and a combination thereof. The hydride can be lithium aluminum hydride ($LiAlH_4$).

In some embodiments, the hydrogen-generating composition only includes a single hydride and is substantially free of other hydrides. In some embodiments, the hydrogen-generating composition only includes one or more hydrides chosen from lithium aluminum hydride ($LiAlH_4$), calcium hydride ($CaH_2$), sodium aluminum hydride ($NaAlH_4$), and aluminum hydride ($AlH_3$), and is substantially free of other hydrides.

In various embodiments, the hydrogen-generating composition only includes the hydride lithium aluminum hydride ($LiAlH_4$), and is substantially free of other hydrides. In some embodiments, the hydrogen-generating composition can be substantially free of simple hydrides that are a metal atom directly bound to a hydrogen atom. In some embodiments, the hydrogen-generating composition can be substantially free of lithium hydride and beryllium hydride.

In various embodiments, the hydrogen-generating composition can be substantially free of hydrides of aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), vanadium (V), tungsten (W), yttrium (Y), ytterbium (Yb), zinc (Zn), zirconium (Zr), hydrides of organic cations including ($CH_3$) methyl groups, or a combination thereof. In some embodiments, the hydrogen-generating composition can be substantially free of one or more of lithium hydride (LiH), sodium hydride (NaH), potassium hydride (KH), magnesium hydride ($MgH_2$), calcium hydride ($CaH_2$), lithium aluminum hydride ($LiAlH_4$), sodium borohydride ($NaBH_4$), lithium borohydride ($LiBH_4$), magnesium borohydride $Mg(BH_4)_2$, sodium aluminum hydride ($NaAlH_4$), or mixtures thereof.

In various embodiments, the hydrogen-generating composition includes a metal hydride (e.g., an interstitial intermetallic hydride). Metal hydrides can reversibly absorb hydrogen into their metal lattice. The metal hydride can be any suitable metal hydride.

The metal hydride can, for example, be $LaNi_5$, $LaNi_{4.6}Mn_{0.4}$, $MnNi_{3.5}Co_{0.7}Al_{0.8}$, $MnNi_{4.2}Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$, $LaNi_{5-x}Al_x$ wherein x is about 0 to about 1, or any combination thereof. The metal hydride can be $LaNi_{5-x}Al_x$ wherein x is about 0 to about 1 (e.g., from $LaNi_5$ to $LaNi_4Al$). The metal hydride can form any suitable proportion of the hydrogen-generating composition, such as about 10 wt % to about 99.999 wt %, or about 20 wt % to about 99.5 wt %, or about 10 wt % or less, or less than, equal to, or greater than about 15 wt %, 20, 21, 22, 23, 24, 25, 26, 27, 28, 29, 30, 35, 40, 45, 50, 55, 60, 65, 70, 75, 80, 85, 90, 91, 92, 93, 94, 95, 96, 97, 98, 99, 99.5, 99.9, 99.99, or about 99.999 wt % or more. Any metal hydride that is described in U.S. Pat. No. 8,172,928, incorporated by reference herein in its entirety, can be included in the present hydrogen-generating composition.

The hydrogen-generating composition can include both a metal hydride (e.g., an interstitial intermetallic hydride, such as $LaNi_{5-x}Al_x$ wherein x is about 0 to about 1), and a chemical hydride (e.g., an ionic hydride or a covalent hydride, such as magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof).

Metal Oxide

In various embodiments, the hydrogen-generating composition can include one or more metal oxides. In some embodiments, the hydrogen-generating composition can be free of metal oxides. The one or more metal oxides can form any suitable proportion of the hydrogen-generating composition, such as about 0.001 wt % to about 20 wt % of the hydrogen-generating composition, about 1 wt % to about 10 wt %, or about 0.001 wt % or less, or less than, equal to, or greater than about 0.01, 0.1, 1, 2, 3, 4, 5, 6, 7, 8, 9, 10, 12, 14, 16, 18, or about 20 wt % or more.

The metal oxide can be any suitable metal oxide, such that the hydrogen-generating composition can be used as described herein. The metal oxide can be zirconium (IV) oxide, hafnium (IV) oxide, titanium (IV) oxide, or a combination thereof. The metal oxide can be titanium (IV) oxide.

The hydrogen-consuming fuel cell can include an anode, a cathode, and an electrically-insulating ion-conducting electrolyte (e.g., a membrane, such as a proton exchange membrane, or PEM) separating the anode and cathode, wherein at least one of the anode or cathode undergoes a chemical reaction that consumes hydrogen and generates an electrical potential across the electrodes. In some embodiments, the cathode of the fuel cell consumes hydrogen gas and generates electrons and hydrogen ions.

The hydrogen ions can travel across the electrolyte to the cathode, while the electrons can travel to the cathode via an electrical circuit connecting the anode to the cathode. At the cathode, the hydrogen ions can react with oxygen gas and the electrons produced by the anode to form water.

The water vapor reacts with the chemical hydride fuel in the hydrogen generator, and generates hydrogen in an exothermic reaction. The hydrogen is carried to a PEM fuel cell as illustrated in FIG. 1 to generate electrical power.

The hydrogen generator 115 may be contained in a replaceable and disposable (recyclable) cartridge such as a container. The hydrogen generator 115 may be cylindrical in geometry in some embodiments.

During the electrochemical reaction in fuel cell 110 that produces energy, water vapor, and heat as reaction byproducts, the ambient air within the path 120 is heated and water is added resulting in hot, wet air travelling through the path at 122.

The water exchanger 155 extracts water from the hot, wet air within ambient air path at 123, and exhausts hot, dry air outside the power generator 100 at exhaust 160. The set point temperature, which in some embodiments is 60° C., may, for example, vary from 40° C. to 80° C. in some embodiments, or outside that range depending on the type of water exchanger utilized as first water exchanger 155. The extracted water from the ambient air path 120 is provided to the anode loop 125 to release additional hydrogen at 124 from hydrogen generator 115. Temperature sensors in the anode and cathode loops may be used to determine and control the water exchanger 155 temperature. One or more sensors may be positioned proximate outlets of the water exchanger to provide a temperature data to the controller 135.

As shown in the embodiment of FIG. 1, the power generator 100 can also include one or more other water exchangers, such as second water exchanger 157. Second water exchanger 157 transfers heat and water vapor to the incoming air at inlet 142, which improves fuel cell performance. In some embodiments a single water exchanger which combines the functions of the first and second water exchangers (e.g. has separate flow paths for the anode and cathode loops) is used to save weight.

Once the released hydrogen travels from hydrogen generator 115 through anode loop 125, it progresses to junction 127 where some of the hydrogen enters a primary path 126 to be recirculated and some hydrogen enters a secondary path 128 to be provided for the electrochemical reaction in fuel cell 110.

As described above, the electrochemical reaction in fuel cell 110 can produce energy. In some embodiments, the fuel cell 110 charges a charge storage device 130. The charge storage device can be a rechargeable battery such as a lithium-ion battery, a capacitor, or any other suitable charge storage device. In other words, charge storage device 130 is coupled to power generator 100 such that charge storage device 130 receives electricity generated by fuel cell 110.

In some implementations, the charge storage device 130 can provide the ability to supply higher and more dynamic levels of power than simply utilizing the fuel cell 110 directly, which can be slower to respond and not normally be able to provide high levels of power that may be required for operation of a UAS in a desired manner, such as accelerating sufficiently while carrying a load. In the embodiment of FIG. 1, power generated by the fuel cell 110 can be provided for storage in one or more charge storage devices 130, and/or provided directly to the load from the controller 135.

As illustrated in FIG. 1, power generator 100 can include controller 135. Controller 135 can provide inputs to power generator 100 such that power generator 100 can run optimally, producing power to be stored in charge storage device 130 for use by a UAS, for example. For example, controller/power management electronics can manage flow of power from the fuel cell to the load, and/or control other aspects of power generation (e.g., regulation of temperatures, pressures, flow rates, etc.)

Controller 135 can provide inputs to power generator 100 in various ways such that power generator 100 can optimally generate power, as are further described herein. For example, in some embodiments, controller 135 can provide inputs to power generator 100 based on a pressure in anode loop 125. In some embodiments, controller 135 can provide inputs to power generator 100 based on a current draw by the load (e.g., a UAS) from charge storage device 130. However, embodiments of the present disclosure are not limited to control schemes for power generator 100. For example, controller 135 can provide inputs for other system controls. For instance, controller 135 can control the temperature of the fuel cell/hydrogen generator, pressure in the anode loop, flow in anode and cathode loops, state of charge of charge storage device, anticipated changes in load from the device the power source is powering, etc.

As described above, in some examples controller 135 can provide inputs to power generator 100 based on a pressure in anode loop 125. Controller 135 can receive a pressure reading in anode loop 125, where the pressure in anode loop 125 is based on the blower fan speed of blower 165.

The pressure reading received by controller 135 can be the pressure in anode loop 126. The pressure in anode loop 126 can be the absolute pressure or the gauge pressure relative to the local ambient pressure. For example, a sensor included in anode loop 125 can determine the pressure in anode loop 125 and transmit the pressure to controller 135. The pressure in anode loop 126 can allow controller 135 to determine a speed of blower 165 in order to allow hydrogen generator 115, fuel cell 110, first water exchanger 155 and/or second water exchanger 157 to operate optimally, as is further described herein. That is, the speed of blower 165 can affect operating parameters of the hydrogen generator 115, fuel cell 110, first water exchanger 155 and/or second water exchanger 157 according to the operational scheme of power generator 100 as described above.

Controller 135 can determine whether the pressure in anode loop 125 exceeds a threshold pressure. As an example, the sensor in anode loop 125 can determine the pressure in anode loop 125 is 8 pounds per square inch (PSI). Controller 135 can compare the received pressure to a threshold pressure to determine whether the received pressure exceeds the threshold pressure. The threshold pressure can be a predetermined pressure stored locally in memory included in controller 135.

The threshold pressure can be a pressure range. For example, the pressure range can include an upper threshold pressure and a lower threshold pressure. For instance, operation of power generator 100 may occur optimally at a particular pressure of the anode loop 125, and the particular pressure of the anode loop 125 can fall within the threshold pressure range. That is, the particular pressure of the anode loop 125 can be within the lower threshold pressure and the upper threshold pressure.

In some examples, controller 135 can determine the pressure in anode loop 125 is less than the lower threshold pressure. For example, the lower threshold pressure can be 5 PSI, and the controller 135 can determine the received pressure in the anode loop 125 is 4 PSI. Accordingly, controller 135 can determine the pressure in anode loop 125 is less than the lower threshold pressure.

A drop in pressure in anode loop 125 can, in some examples, correspond to a higher power requirement by the load from charge storage device 130. For example, in response to more power being drawn by the load (e.g., by a UAS), more energy from fuel cell 110 may be needed to meet the demand. As the rate of hydrogen being used by fuel cell 110 increases to generate more energy, the pressure in anode loop 125 can drop, causing the pressure to fall below the lower threshold pressure.

In order to compensate for the rate of hydrogen being utilized by fuel cell 110 from hydrogen generator 115 increasing as a result of the increased load from the UAS, controller 135 can modify the speed of blower 165 to increase the hydrogen generation rate in the hydrogen generator. Controller 135 can modify the speed of blower 165 by increasing the blower speed such that blower 165 can provide more water vapor to the hydrogen generator 115, which increases the hydrogen generation rate. Increasing the speed of blower 165 thus increases the pressure in anode loop 125 (e.g., to within the threshold pressure range as described above). As a result, operational parameters for various components of power generator 100 can be kept to within ideal operational limits.

In some examples, controller 135 can determine the pressure in anode loop 125 exceeds the upper threshold pressure. For example, the upper threshold pressure can be 12 PSI, and the controller 135 can determine the received pressure in the anode loop 125 is 14 PSI. Accordingly, controller 135 can determine the pressure in anode loop 125 has exceeded the upper threshold pressure.

An increase in pressure in anode loop 125 can, in some examples, correspond to a lower power requirement by the load or the charge storage device 130. For example, in response to lower power being used by the load (e.g., by a UAS) or by charge storage device 130, power may be required from fuel cell 110. As the rate of hydrogen being used by fuel cell 110 decreases to generate less power for charge storage device 130, the pressure in anode loop 125 can increase, causing the pressure to increase above the higher threshold pressure.

In order to compensate for the rate of hydrogen being utilized by fuel cell 110 from hydrogen generator 115 decreasing as a result of the decreased load from the UAS or charge storage device 130, controller 135 can modify the speed of blower 165. Controller 135 can modify the speed of blower 165 by decreasing the blower speed such that blower 165 can provide less water vapor to hydrogen generator 115, which decreases the hydrogen generation rate. Decreasing the speed of blower 165 can correspondingly decrease the pressure in anode loop 125 (e.g., to within the threshold pressure range as described above). As a result, operational parameters for various components of power generator 100 can be kept to within ideal operational limits.

Although the lower threshold pressure is described above as being 5 PSI and the upper threshold pressure is described above as being 14 PSI, embodiments of the present disclosure are not so limited. For example, the upper and lower threshold pressures can be any other pressure value. In some examples, the pressure values of the upper and lower threshold pressures can vary based on the load (e.g., the UAS), the type of hydrogen fuel utilized by hydrogen generator 115, among other parameters.

As described above, modifying the speed of blower 165 can affect operating parameters of various components of power generator 100. For example, modifying the speed of blower 165 to modify the pressure in anode loop 125 can maintain an inlet and outlet relative humidity of fuel cell 110 within a predetermined range, maintain an inlet and outlet relative humidity of hydrogen generator 115 within a predetermined range, maintain an inlet and outlet relative humidity of first water exchanger 155 and/or second water exchanger 155 within a predetermined range, and/or a temperature of first water exchanger 155 and/or second water exchanger 155 within a predetermined range, among other operating parameters and/or other operating parameters of other components of power generator 100.

Various sensors can be utilized to monitor components of power generator 100. For example, the various components of power generator 100 can include temperature sensors that can transmit temperatures of hydrogen generator 115, fuel cell 110, and/or first water exchanger 155 and/or second water exchanger 157 to controller 135. In some examples, controller 135 can maintain operating temperatures of the hydrogen generator 115, fuel cell 110, and/or first water exchanger 155 and/or second water exchanger 157 utilizing a fan and/or fans (e.g., operation of the fan/fans can lower the operating temperatures). In some examples, controller 135 can maintain operating temperatures of the hydrogen generator 115, fuel cell 110, and/or first water exchanger 155 and/or second water exchanger 157 utilizing a pump circulating cooling fluid to the components of power generator 100 (e.g., operation of the pump circulating the cooling fluid can lower the operating temperatures).

As described above, in some examples controller 135 can provide inputs to power generator 100 based on a current draw by the load (e.g., a UAS) from charge storage device 130. Controller 135 can receive an amount of current draw from charge storage device 130 coupled to fuel cell 110. As described above, the charge storage device 130 receives electricity generated by fuel cell 110 in response to hydrogen being provided to an anode of fuel cell 110. Hydrogen can be supplied to the anode via blower 165 by way of anode loop 125 and secondary path 128.

The current draw from charge storage device 130 can be by the load in addition to that drawn by controller 135 and the mechanisms controlled by controller 135. For example, a UAS may be drawing current from charge storage device 130 in order to operate. The current draw from charge storage device 130 can be measured by a sensor. For example, a current sensor can measure the current from charge storage device 130 to the load and transmit the current to controller 135.

Controller 135 can determine whether the current draw from charge storage device 130 exceeds a threshold current draw. As an example, the current sensor can determine the current draw from charge storage device 130 to be 50A. Controller 135 can compare the received current draw to a threshold current draw to determine whether the received current draw exceeds the threshold current draw. The threshold current draw can be a predetermined current draw stored locally in memory included in controller 135.

The threshold current draw can be a current draw range. For example, the current draw range can include an upper threshold current draw and a lower threshold current draw.

In some examples, controller 135 can determine the current draw from charge storage device 130 exceeds the upper threshold current draw. For example, the upper threshold current draw can be 55 A, and the controller 135 can determine the current draw from charge storage device 130 is 60A. Accordingly, controller 135 can determine the current draw from charge storage device 130 exceeds the upper threshold current draw. An increase in current draw from charge storage device 130 can indicate the load (e.g., the UAS) is utilizing more power.

In order to compensate for the increase in current draw by the load from charge storage device 130, controller 135 can modify the speed of blowers 165 and 140. Controller 135 can modify the speed of blowers 165 and 140 to provide more hydrogen from hydrogen generator 115 and air from ambient to fuel cell 110 by increasing a blower fan speed of blowers 165 and 140. As a result of more hydrogen and air being provided to fuel cell 110, fuel cell 110 can generate more electricity to provide to charge storage device 130 to compensate for the increase in power by the UAS so the UAS can continue to operate.

In some examples, controller 135 can determine the current draw from charge storage device 130 is less than the lower threshold current draw. For example, the lower threshold current draw can be 35 A. In an example, the controller 135 may determine the current draw from charge storage device 130 is 30 A. Accordingly, controller 135 can determine the current draw from charge storage device 130 (e.g., 30 A) is less than the threshold current draw (e.g., 35 A). The decrease in current draw from charge storage device 130 can indicate the load (e.g., the UAS) is utilizing less power.

In order to compensate for the decrease in current draw by the load from charge storage device 130, controller 135 can modify the speed of blowers 165 and 140. Controller 135 can modify the speed of blowers 165 and 140 to provide less hydrogen from hydrogen generator 115 and air from ambient to fuel cell 110 by reducing a blower fan speed of blowers 165 and 140. As a result of less hydrogen and air being provided to fuel cell 110, fuel cell 110 can generate less electricity to provide to charge storage device 130.

Although the upper threshold current draw is described above as being 55 A and the lower threshold current draw is described above as being 35 A, embodiments of the present disclosure are not so limited. For example, the upper and lower threshold current draws can be any other current values.

The controller 135 may use PID type control algorithms to control the speed of blowers 165 and 140 to maintain the operating parameters of the various components of power generator 100. Other control algorithms may be used in further embodiments, such as modeling and any other type of algorithm sufficient to control the operating parameters of the various components of power generator 100 by controlling the speed of blowers 165 and 140.

In one embodiment, the cooling mechanism 132 utilizes a coolant, such as air, water, or some other fluid and a fan or other means to move the fluid in thermal contact with the fuel cell to cool the fuel cell under control of the controller 135 based on data provided by the first temperature sensor 143. The fluid is obtained from a different source, such as ambient, separate from the cathode loop ambient air path and the anode loop, to allow independent control of the temperature of the fuel cell. The flow in the anode and cathode loops may also be controlled independent from the control of the cooling mechanism. The cooling mechanism may utilize any means for cooling the fuel cell in further embodiments, whether active or passive. The embodiments described above may be light in weight, allowing better weight to energy ratios for UAS applications and other applications where size and weight limits are present.

Figure 2:
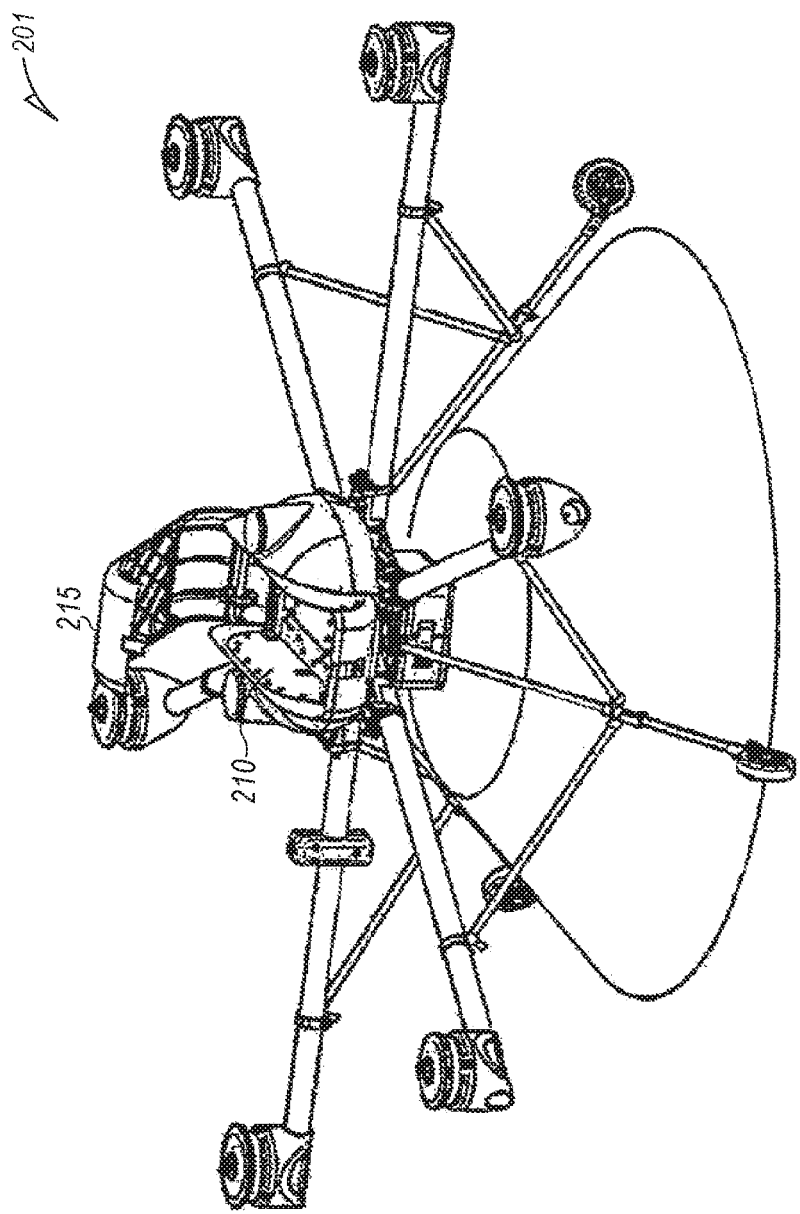
FIG. 2 is a perspective view of an unmanned air system (UAS) illustrating an open battery compartment according to an example embodiment.

FIG. 2 is a perspective view of a UAS 201 illustrating an open battery compartment 210 according to an example embodiment. A hinged cover 215 is shown as open. In the embodiment illustrated in FIG. 2, the compartment 210 provides space and cooling for fuel cell integration. The fuel cell based power generator will provide power resulting in a virtually silent long endurance ISR platform with outstanding capability and stability. The use of the hybrid power generator with batteries charged from the fuel cell will provide rates of electrical power suitable for the above functions. Multiple functions combined with long endurance provides maximum operational value and flexibility.

Figure 3:
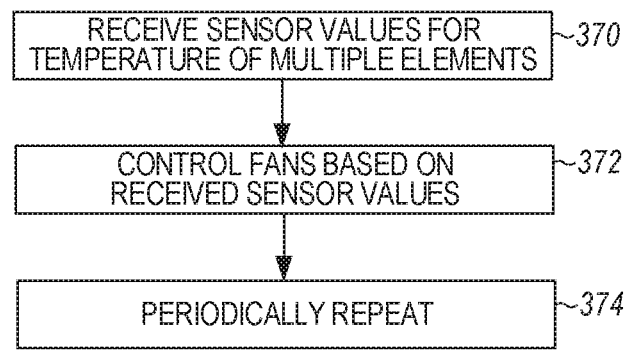
FIG. 3 is a flowchart illustrating a method of controlling the temperature of multiple elements of a fuel cell based power generator according to an example embodiment.

FIG. 3 is a flow diagram illustrating control of temperatures of elements of the fuel cell based power generator according to an example embodiment. In some embodiments, the power management circuitry (e.g., 135 of FIG. 1), also referred to as a controller, executes functions to control fluid movement apparatus speeds and hence temperature of selected elements as described above.

At 370, the controller obtains data from numerous sensors regarding the temperature of various element and/or gas or fluid at selected portions of the hydrogen and ambient air paths. At 372, the signals are generated to control fluid movement apparatus speeds based on the received sensor values to control the temperatures of the elements to their corresponding set points.

As mentioned herein, the control algorithm may be based on standard PID type control algorithms which may involve one or more or proportion, integral, and derivative control. At 374, the controller periodically repeats method described above. If programmable digital control is used, periodically means simple repeating the method in succession. If analog control is used, periodical may mean continuous control.

Figure 4:
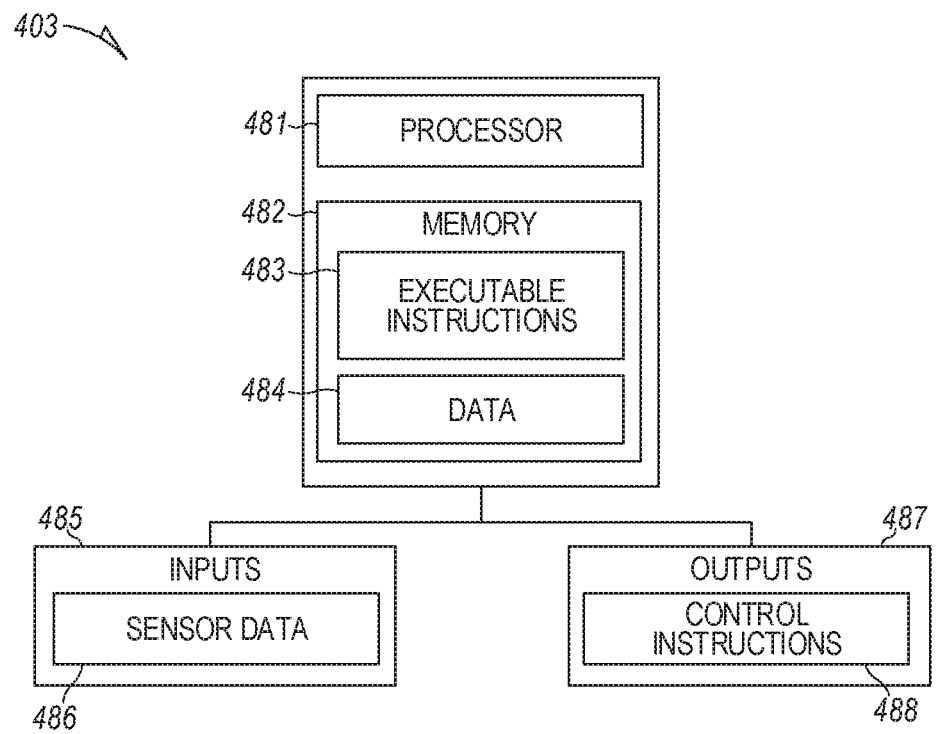
FIG. 4 is a block diagram of a specifically programmed circuitry or processor for executing control methods for a hydrogen fuel cell based power generator according to an example embodiment.

FIG. 4 is a block diagram of a specifically programmed system for executing control methods for a hydrogen fuel cell based power generator according to an example embodiment. In the embodiment of FIG. 4, a hardware and operating environment of the system includes a general purpose computing device in the form of a computer 403 (e.g., a microcontroller, personal computer, workstation, or server), including one or more processing units 480 and memory 481. There may be only one or there may be more than one processing unit 480, such that the processor of computer 403 comprises a single central-processing unit (CPU), or a plurality of processing units, commonly referred to as a multiprocessor or parallel-processor environment. In various embodiments, computer 400 is a conventional computer, a distributed computer, or any other type of computer.

The memory can also be referred to as simply memory, and, in some embodiments, includes read-only memory (ROM), random-access memory (RAM). Memory can be stored on a computing device, a memory device, or a computer readable medium, such as a memory stick, CD, tape, or other suitable medium for storing data and/or computing device executable instructions.

A number of executable instruction types 483 can be stored in memory. For example, memory 482 can include an operating system, one or more application programs, other program modules, and data stored in memory (e.g., for use by one or more programs) 484. Programming for implementing one or more processes or method described herein may be resident on any one or number of these computer-readable media.

In further embodiments, power management and control electronics include one or more temperature and power output sensors that are used by the control electronics to control the speed of one or more fluid movement apparatuses to maintain ideal temperatures and power output. These sensors can provide sensor data 486 as inputs into the computing device 403 for use by one or more programs therein via executable instructions 483 executed by processor 481 or to be stored in memory 482 for use by another computing device.

The control electronics may be configured to maintain design points for such temperatures and/or power output, and/or may utilize one or more equations that are parameterized based on empirical data obtained from operation of a nominal PEM fuel cell based power generator. Instructions 488 to adjust one or more components of a system (e.g., system 100 of FIG. 1) can be sent via one or more outputs 487. Such outputs can be via a wired connection between the computing device and one or more other components of the system or can be communicated via a wireless connection.

Embodiments of the present disclosure provide many benefits over previous systems. For example, embodiments are disclosed herein that reduce the weight of the energy producing system be reducing components, reducing fuel supplies, by products, and leftover materials needed to be carried, among other benefits described herein and understood from reading this disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

What is claimed:

1. A fuel cell based power generator, comprising:
   a fuel cell element;
   a hydrogen generator element having a hydride composition configured to generate hydrogen in response to receiving water vapor;
   a water exchanger element;
   an ambient air path configured to receive ambient air and provide the ambient air across a cathode side of the fuel cell element, receive water from the fuel cell element and provide wet air to the water exchanger element, wherein the water exchanger element is coupled to the ambient air path downstream from the fuel cell element and coupled to extract water from air in the ambient air path and provide water vapor to the hydrogen generator element; and
   a fuel cell cooling mechanism associated with the fuel cell element, separate from the ambient air path and configured to cool the fuel cell element.

2. The fuel cell based power generator of claim 1 and further comprising an anode loop coupled to receive water from the water exchanger element, provide the water to the hydrogen generator, and recirculate hydrogen to an anode side of the fuel cell.

3. The fuel cell based power generator claim 2 and further comprising
   power management circuitry coupled to the fuel cell element to receive electricity generated by the fuel cell element and provide electricity to a load;
   a charge storage device for storing electricity generated by the fuel cell element;
   a fuel cell temperature sensor positioned to sense a temperature of the fuel cell element; and
   a controller to control fuel cell cooling mechanism based on the sensed temperature of the fuel cell element.

4. The fuel cell based power generator of claim 3, further including a blower coupled to the controller to adjust the speed of fluid moving through the recirculating hydrogen path based on fluid loop pressure measured via a pressure sensor.

5. The fuel cell based power generator of claim 2, further comprising:

a hydrogen generator element temperature sensor positioned to sense a temperature of the hydrogen generator element; and a cooling mechanism associated with the hydrogen generator and configured to control a speed of a fan configured to control the hydrogen generator temperature based on the sensed hydrogen generator temperature.

6. The fuel cell based power generator claim 2, wherein the anode loop comprises a secondary path to provide hydrogen to the anode of the fuel cell element, and a primary path coupled to recirculate hydrogen in a loop including the water exchanger element and the hydrogen generator.

7. The fuel cell based power generator of claim 6, wherein the secondary path includes a purge valve to purge inert material into the ambient air path.

8. The fuel cell based power generator of claim 2, further comprising:
a water exchanger element temperature sensor positioned to sense a temperature of the water exchanger element;
a recirculating hydrogen path heat exchanger with fan disposed in the anode loop coupled to the water exchanger element;
an ambient air path water heat exchanger element with fan disposed in the ambient air path coupled to the water exchanger element.

9. The fuel cell based power generator of claim 2, wherein the system includes a speed control for a cooling mechanism associated with the hydrogen generator.

10. The fuel cell based power generator of claim 2, wherein the first water exchanger element is coupled to receive wet air from the ambient air path, dry hydrogen from the recirculating hydrogen path, exhaust dryer air, and provide wet hydrogen to the hydrogen generator element via the anode loop.

11. The fuel cell based power generator of claim 10 and further comprising a second water exchanger element coupled to receive the dryer air from the first water exchanger and provide water extracted from the received dryer air to the ambient air path upstream from the fuel cell cathode.

12. A fuel cell based power generator, comprising:
a fuel cell element;
a first water exchanger element and a second water exchanger element;
a hydrogen generator element;
an ambient air path configured to receive ambient air and provide the ambient air across a cathode side of the fuel cell element, receive water from the fuel cell element and provide wet air to at least one of the first and second water exchanger elements; and
a recirculating hydrogen path having a first path and a second path, the second path configured to receive hydrogen from the hydrogen generator element, provide the hydrogen, via the second path that passes adjacent an anode side of the fuel cell element and configured to provide dry hydrogen back to the hydrogen generator, via the first path.

13. The fuel cell based power generator of claim 12, wherein the first water exchanger element transfers water from the ambient air path to the recirculating hydrogen path.

14. A fuel cell based power generator, comprising:
a fuel cell element;
a first water exchanger element;
a hydrogen generator element;
an ambient air path configured to receive ambient air and provide the ambient air across a cathode side of the fuel cell element, receive water from the fuel cell element and provide wet air to the first water exchanger element; and
a recirculating hydrogen path having a first path and a second path, the second path configured to receive hydrogen from the hydrogen generator element, provide the hydrogen, via the second path that passes adjacent an anode side of the fuel cell element and configured to provide dry hydrogen back to the hydrogen generator, via the first path.

15. The fuel cell based power generator of claim 14, wherein the first water exchanger element transfers water from the ambient air path to the recirculating hydrogen path.

16. The fuel cell based power generator of claim 15 an further including a second water exchanger coupled to transfer heat and water vapor from the ambient airpath downstream from the first water exchanger to the ambient airpath upstream of the fuel cell element.

17. The fuel cell based power generator claim 15 and further comprising
power management circuitry coupled to the fuel cell element to receive electricity generated by the fuel cell element and provide electricity to a load;
a charge storage device for storing electricity generated by the fuel cell element;
a fuel cell temperature sensor positioned to sense a temperature of the fuel cell element; and
a controller to control fuel cell cooling mechanism based on the sensed temperature of the fuel cell element.

18. The fuel cell based power generator of claim 17, further including a blower coupled to the controller to adjust the speed of fluid moving through the recirculating hydrogen path based on fluid loop pressure measured via a pressure sensor.

19. The fuel cell based power generator of claim 18, further comprising:
a hydrogen generator element temperature sensor positioned to sense a temperature of the hydrogen generator element; and
a cooling mechanism associated with the hydrogen generator and configured to control a speed of a fan configured to control the hydrogen generator temperature based on the sensed hydrogen generator temperature.

* * * * *